United States Patent
Xu et al.

(10) Patent No.: US 7,941,424 B2
(45) Date of Patent: May 10, 2011

(54) SYSTEM, METHOD, AND COMPUTER-READABLE MEDIUM FOR DYNAMIC DETECTION AND MANAGEMENT OF DATA SKEW IN PARALLEL JOIN OPERATIONS

(75) Inventors: Yu Xu, San Diego, CA (US); Pekka Kostamaa, Santa Monica, CA (US); Mark Sirek, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 412 days.

(21) Appl. No.: 12/130,060

(22) Filed: May 30, 2008

(65) Prior Publication Data

US 2009/0299956 A1    Dec. 3, 2009

(51) Int. Cl.
G06F 7/00 (2006.01)
G06F 17/30 (2006.01)

(52) U.S. Cl. .................. 707/714; 707/770
(58) Field of Classification Search .......... 707/713, 707/714, 999.002, 769, 770
See application file for complete search history.

(56) References Cited

U.S. PATENT DOCUMENTS

| | | | | |
|---|---|---|---|---|
| 5,873,074 | A * | 2/1999 | Kashyap et al. | 1/1 |
| 5,978,793 | A * | 11/1999 | Kashyap et al. | 1/1 |
| 7,203,686 | B1 * | 4/2007 | Sinclair et al. | 1/1 |
| 7,640,257 | B2 * | 12/2009 | Watzke | 1/1 |
| 2004/0093320 | A1 * | 5/2004 | Shin | 707/2 |
| 2004/0215639 | A1 * | 10/2004 | Bamford et al. | 707/100 |
| 2008/0065594 | A1 * | 3/2008 | Faunce et al. | 707/2 |
| 2008/0092142 | A1 * | 4/2008 | Tran et al. | 718/105 |
| 2008/0228709 | A1 * | 9/2008 | Muras | 707/2 |
| 2008/0228710 | A1 * | 9/2008 | Muras | 707/2 |
| 2009/0024568 | A1 * | 1/2009 | Al-Omari et al. | 707/2 |

FOREIGN PATENT DOCUMENTS
EP       421408 A2 *   4/1991

OTHER PUBLICATIONS

M. Bamha et al., An effiicient scalable parallel view maintenance algorithm for shared nothing multi-processor machines, pp. 1-10, publsihed 1999.*
David Dewitt et al., Practical Skew Handling in Parallel Joins, 18th VLDB Conference, pp. 1-14, published 1992.*
Yu Xu et al., Handling Data Skew in Parallel Joins in Shared-nothing Systems, SIGMOD 2008, pp. 1-10, published Jun. 2008.*
Xiaofang Zhou, Handling Data Skew in Parallel Hash Join Computation Using Two-phase Scheduling, IEEE, pp. 527-527, published 1995.*

* cited by examiner

Primary Examiner — James Trujillo
Assistant Examiner — Jeffrey Burke
(74) Attorney, Agent, or Firm — Steve McDonald; Michael Chan

(57) ABSTRACT

A system, method, and computer-readable medium for dynamic detection and management of data skew in parallel join operations are provided. Receipt of an excessive number of redistributed rows by a processing module is detected thereby identifying the processing module as a hot processing module. Other processing modules then terminate redistribution of rows to the hot processing module and maintain rows of a skewed table of the join operation that would be redistributed to the hot processing module in a local spool. Rows of a smaller table that would be redistributed to the hot processing module are duplicated to each processing module involved in the join operation. Rows of tables that are to be redistributed by a processing module to any processing module excluding the hot processing module are redistributed accordingly and maintained locally by the processing module. The join operation is completed by merging results of local join data sets of each processing module.

6 Claims, 8 Drawing Sheets

SYSTEM, METHOD, AND COMPUTER-READABLE MEDIUM FOR DYNAMIC DETECTION AND MANAGEMENT OF DATA SKEW IN PARALLEL JOIN OPERATIONS

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

In massively parallel processing (MPP) systems, dealing with data skew in parallel joins is critical to the performance of many applications. As is understood, a join comprises a structured query language (SQL) operation that combines records from two or more tables. Partial redistribution, partial duplication (PRPD) mechanisms have been proposed for an optimizer to use when joining large tables where data skew is known and the skewed data values are also known. For example, assume a join is to be performed with a large relation R having 10 million rows and a smaller relation S having 1 million rows featuring a join condition R.a=S.b (where a and b are columns of the relations R and S respectively). Assume both R and S are evenly partitioned across all processing modules, e.g., Access Module Processors (AMPs), and neither R.a nor S.b is the primary index, e.g., the values that are hashed to distribute the base table rows to MPP processing modules, of R or S. As referred to herein, hash redistribution comprises generating a hash value of, for example, column or index values of a table and redistributing the corresponding rows to processing modules based on the hash values. Further assume there are 100 AMPs deployed in the MPP system. Without data skew in column R.a (e.g., relation R can be roughly evenly hash partitioned on R.a), the optimizer will hash redistribute rows of R on R.a and hash redistribute rows of S on S.b to join R and S. Each AMP will join about 100,000 rows of R and 10,000 rows of S.

However, consider the case where there is data skew in column R.a. Assume there is a single data value of column R.a which appears in 1 million rows of R. The above redistribution plan will redistribute 1 million rows of R with the skewed value in R.a to a single AMP. In this instance, the AMP having 1 million rows redistributed thereto will have an excessive load with respect to other AMPs involved in the join operation. An AMP featuring an excessive load in such a situation is referred to herein as a hot AMP. In the present example, the hot AMP will have about 1,090,000 rows while all other 99 AMPs will have only about 90,000 rows of R. Consequently, the system performance is degraded and may result in an "out of spool space" error on the hot AMP, which causes queries to abort often after hours of operation in large data warehouses. Out of spool space may occur because, although disk capacity continues to become larger and cheaper, parallel DBMSs may still maintain spool space quotas for users on each AMP for the purpose of workload management and concurrency control.

Contemporary PRPD plans handle the above described data skew problem by keeping the rows of R with the skewed value in R.a locally and duplicating the rows of S that have the skewed value in S.b. However, such a PRPD mechanism assumes the skewed values in R are known before query execution time, e.g., by statistics, sampling, or a full table scan.

SUMMARY

Disclosed embodiments provide a system, method, and computer readable medium for a dynamic approach to resolving data skew issues when executing a parallel join without foreknowledge that data skew is present and without a list of skewed data values. Rows allocated to processing modules involved in the join operation are initially redistributed among the processing modules by a hash redistribution on the join columns. Receipt of an excessive number of redistributed rows by a processing module is detected during the join operation thereby identifying the processing module as a hot processing module. Other processing modules then terminate redistribution of rows to the hot processing module and maintain rows of the larger table that would be redistributed to the hot processing module in a local spool. Rows of the smaller table that would be redistributed to the hot processing module are duplicated to each processing module involved in the join operation thereby implementing a partial redistribution, partial duplication of the table rows. Rows of tables that are to be redistributed by a processing module to any processing module excluding the hot processing module are redistributed accordingly and maintained locally by the processing module. The join operation is completed by performing a local join at each processing module and merging the results of the local join operations.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
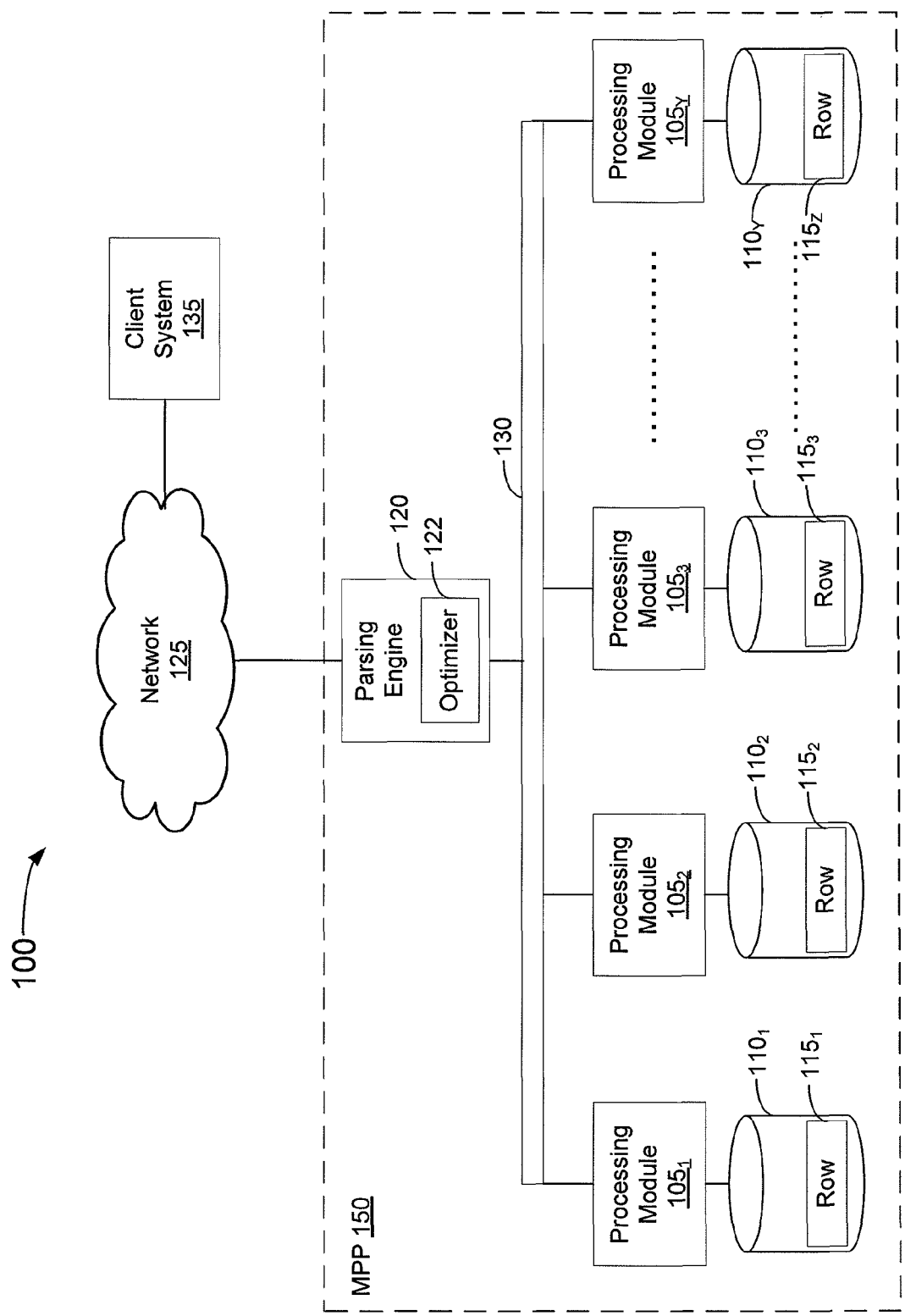
FIG. 1 depicts a diagrammatic representation of an exemplary architecture for a large database system that is suited for implementing mechanisms for dynamic detection and handling of data skew in parallel joins in accordance with disclosed embodiments.

FIG. 1 depicts a diagrammatic representation of an exemplary architecture for a large database system 100, such as a Teradata Active Data Warehousing System, that is suited for implementing mechanisms for dynamic detection and handling of data skew in parallel joins in accordance with disclosed embodiments. The database system 100 includes a relational database management system (RDBMS) built upon a massively parallel processing (MPP) system 150. Other types of database systems, such as object-relational database management systems (ORDBMS) or those built on symmetric multi-processing (SMP) platforms, are also suited for use, and the depicted and described architecture is exemplary only and is chosen to facilitate an understanding of the disclosed embodiments.

As shown, the database system 100 includes one or more processing modules $105_1 \ldots {}_Y$ that manage the storage and retrieval of data in data-storage facilities $110_1 \ldots {}_Y$. Each of the processing modules may host one or more AMPs. Each of the processing modules $105_1 \ldots {}_Y$ manages a portion of a database that is stored in a corresponding one of the data-storage facilities $110_1 \ldots {}_Y$. Each of the data-storage facilities $110_1 \ldots {}_Y$ includes one or more disk drives or other storage medium.

The system stores data in one or more tables in the data-storage facilities $110_1 \ldots {}_Y$. The rows $115_1 \ldots {}_Z$ of the tables are stored across multiple data-storage facilities $110_1 \ldots {}_Y$ to ensure that the system workload is distributed evenly across the processing modules $105_1 \ldots {}_Y$. A parsing engine 120 organizes the storage of data and the distribution of table rows $151_1 \ldots {}_Z$ among the processing modules $105_1 \ldots {}_Y$ and accesses processing modules $105_1 \ldots {}_Y$ via an interconnect 130. The parsing engine 120 also coordinates the retrieval of data from the data-storage facilities $110_1 \ldots {}_Y$ in response to queries received from a user, such as one using a client computer system 135 connected to the database system 100 through a network connection 125. The parsing engine 120, on receiving an incoming database query, applies an optimizer component 122 to the query to assess the best plan for execution of the query. Selecting the optimal query-execution plan includes, among other things, identifying which of the processing modules $105_1 \ldots {}_Y$ are involved in executing the query and which database tables are involved in the query, as well as choosing which data-manipulation techniques will serve best in satisfying the conditions of the query. Database statistics are used in making these assessments during construction of the query-execution plan. For example, database statistics may be used by the optimizer to determine data demographics, such as attribute minimum and maximum values and data ranges of the database. The database system typically receives queries in a standard format, such as the Structured Query Language (SQL) put forth by the American National Standards Institute (ANSI).

In a system in which rows of tables or relations may be distributed across multiple processing nodes, a join operation executed in parallel may be performed efficiently when the data is uniformly distributed across the system by a redistribution mechanism. However, if one processing module, e.g., an AMP, receives much more data than other AMPs, processing results of a parallel join may demonstrate a relatively slow response time, excessive system resource usage may be consumed, and such an operation may exhibit a low overall system parallel efficiency. Adding additional nodes or AMPs may decrease the overall parallel efficiency since adding more nodes may result in distribution of less rows to each non-hot AMP thereby producing a greater relative disproportionate distribution of rows to the hot AMP.

An AMP may receive significantly more data due to various causes, such as a natural demographic data skew, e.g., high biased values, skew resulting from null values, or various other causes.

Alternatively, a table may be duplicated to each AMP involved in processing of the parallel join if the table is much smaller than the other table involved in the parallel join. Duplicating a table across AMPs involved in a parallel join is referred to as table duplication.

Most base tables, e.g., user-defined tables that are physically stored in system 100, have carefully designed primary indexes to evenly distribute rows across all AMPs of a MPP system. However, skew naturally and frequently occurs in certain types of join operations. Redistribution of tables on join columns often results in severely degraded performance if a join column has highly-skewed values. Duplication of the smaller table involved in a join is typically efficient when skew occurs in the join column of the larger table assuming the rows are evenly distributed across the AMPs. However, the duplication cost is not scalable—the larger the system, the more expensive table duplication is in terms of both I/O and CPU cost on all AMPs as well as the overall network bandwidth.

Figure 2:
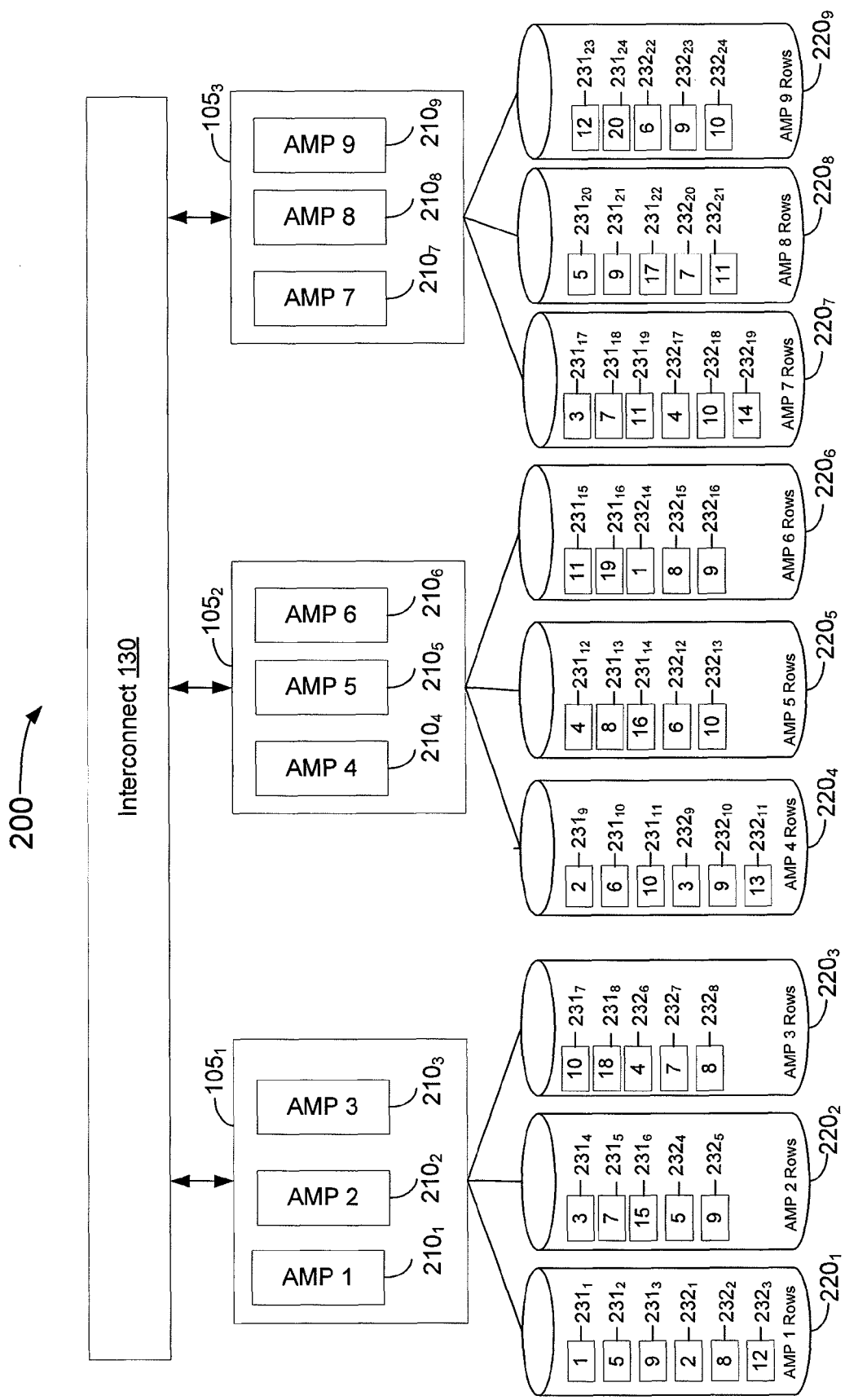
FIG. 2 is a diagrammatic representation of a massively parallel processing system configuration in which a table redistribution may be performed to facilitate execution of a parallel join.

FIG. 2 is a diagrammatic representation of an MPP configuration 200 in which a table redistribution may be performed to facilitate execution of a parallel join. In the illustrative example, assume the rows of two tables have been distributed across nine AMPs $210_1$-$210_9$ hosted by processing modules $105_1$-$105_3$ such that each of the AMPs is allocated rows $220_1$-$220_9$. Consider a join operation to be executed that is specified by the following:

Select*from Table1, Table2 where Table1.$a$=Table2.$b$

Figure 3:
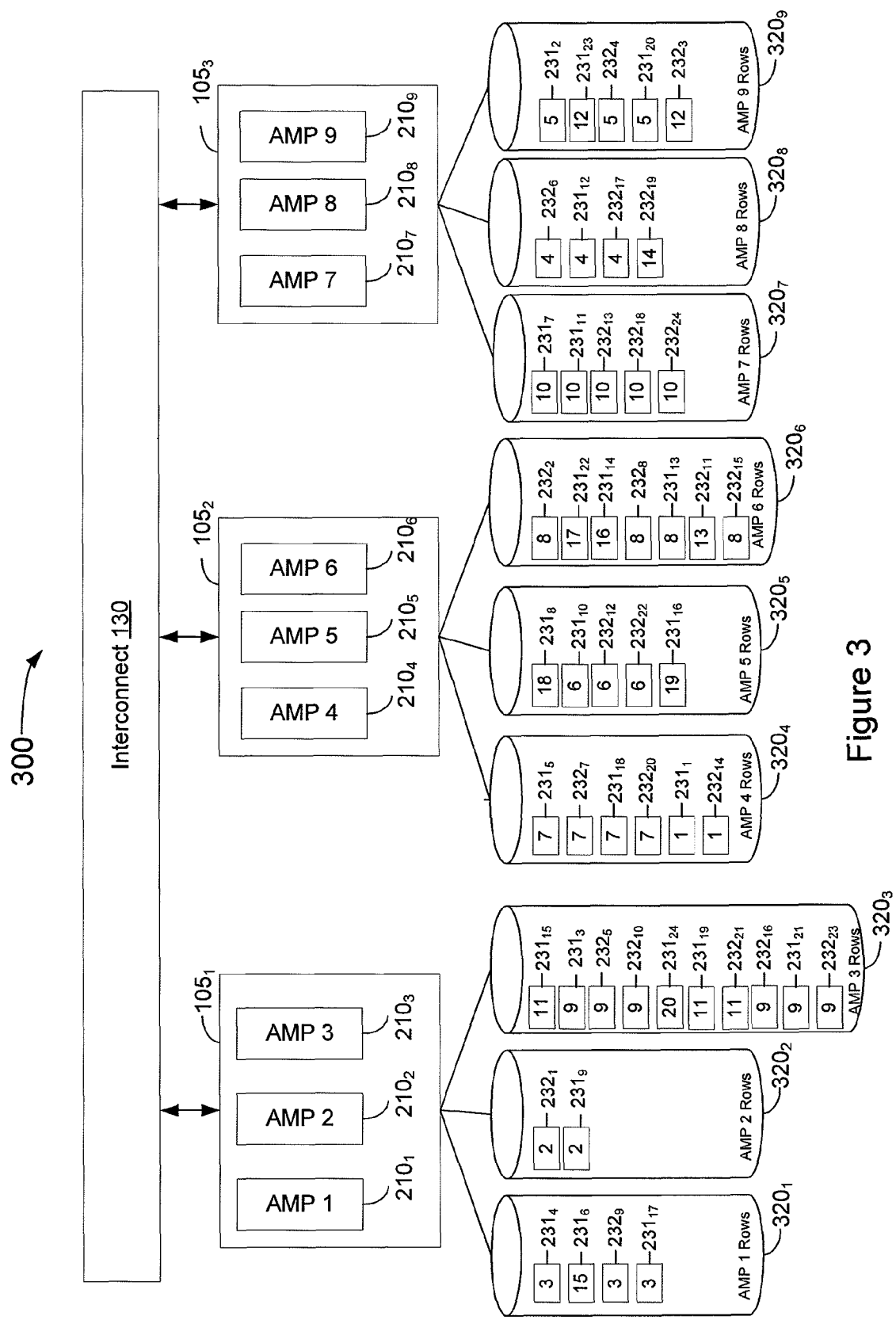
FIG. 3 depicts a diagrammatic representation of a redistribution of tables that facilitates execution of a parallel join.

In the present example, column a elements of Table1 are designated $231_1$-$231_{24}$ and column b elements of Table2 are designed $232_1$-$232_{24}$. Assume that the rows of Table1 and Table2 are distributed among AMPs $210_1$-$210_9$ via a hash of primary indexes of Table1 and Table2 and that the primary indexes include neither column a of Table1 nor column b of Table2. In this situation, the rows may be redistributed by hashing the join columns and redistributing the rows based on the hash values such that rows from Table1 and Table2 that match on the join columns Table1.$a$ and Table2.$b$ are redistributed to the same AMPs. For example, FIG. 3 depicts a diagrammatic representation 300 of a redistribution of the table rows $220_1$-$220_9$ that facilitates execution of the join operation. Each AMP $210_1$-$210_9$ hashes the rows $220_1$-$220_9$ originally distributed thereto, and redistributes the rows according to the hash values. Accordingly, the AMPs $210_1$-$210_9$ respectively receive redistributed rows $320_1$-$320_9$. By hashing the column elements of the join statement, matching column elements are redistributed to a common AMP, and the join statement may then be completed in parallel. For example, element $231_1$ of Table1.a has a value of "1", and element $232_{14}$ of Table 2.b has a value of "1". Because neither column a of Table1 nor column b of Table2 is included in the primary indexes by which the tables are originally distributed in the MPP system, element $231_1$ and $232_{14}$ are originally distributed to AMP $210_1$ and $210_6$ as depicted in FIG. 2. By hashing the join columns and redistributing the tables according to the hashed elements, both element $231_1$ and $232_{14}$ are redistributed to a common AMP, e.g., AMP $210_4$ as depicted in FIG. 3. After hash redistribution of the tables, the join operation may then be executed in parallel.

Redistribution of tables for execution of a parallel join is efficient if data skew is small. However, numerous problems may be encountered in the event that there is data skew in a column on which a join is to be performed as discussed hereinabove.

In accordance with an embodiment, data skew issues are managed by maintaining the rows of a table with a skewed value local with the original AMP, and duplicating the rows of the other table that have the skewed, i.e., matching value, in the column to be joined. Embodiments disclosed herein provide for a dynamic approach to manage data skew for executing a parallel join without foreknowledge that data skew is present, e.g., by statistics, sampling, or a full table scan, and without a list of skewed data values.

Figure 4:
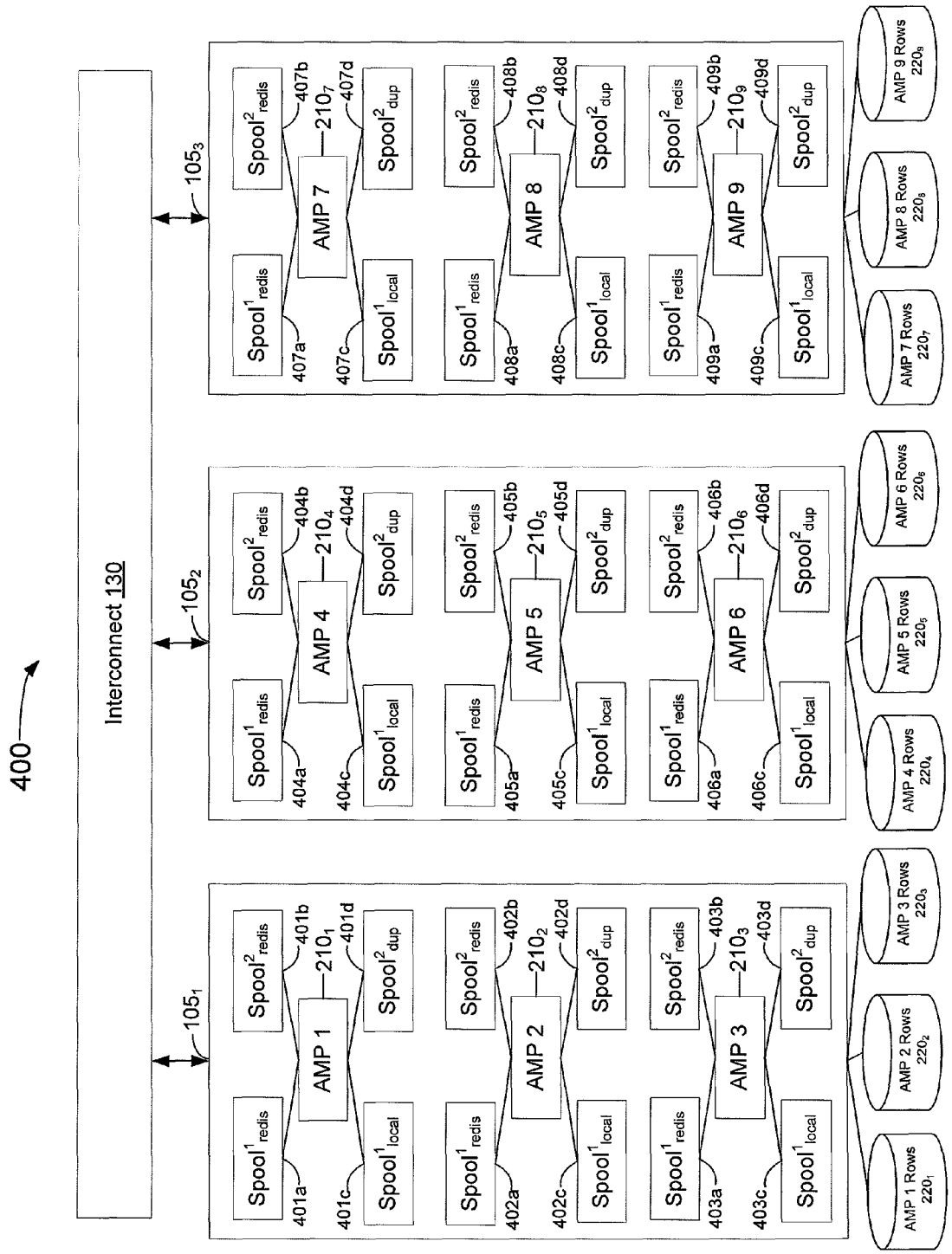
FIG. 4 is a diagrammatic representation of a massively parallel processing system configuration that facilitates dynamic detection and management of data skew for parallel join operations in accordance with an embodiment.

FIG. 4 is a diagrammatic representation of an MPP system configuration 400 that facilitates dynamic detection and management of data skew for parallel join operations in accordance with an embodiment. In the examples provided herein, a join operation is to be executed on a column (designated column a) of a first table designated Table1 and a column (designated column b) of a second table designated Table2. The rows of the tables have been distributed among a plurality of AMPs $210_1$-$210_9$ by, for example, a hash of respective primary indexes of the tables Table1 and Table2. Thus, one or more of the AMPs $210_1$-$210_9$ have respective rows $220_1$-$220_9$ distributed thereto. It is further assumed the join columns Table1.a and Table2.b are not included in the indexes on which the tables are originally distributed in the MPP system.

A dynamic skew detection routine implemented in accordance with an embodiment initially executes a redistribution of the table rows by a hash redistribution of the join columns. Thus, in the present example, each of the AMPs $210_1$-$210_9$ begins to redistribute the rows $220_1$-$220_9$ allocated thereto by hashing the join columns Table1.a and Table2.b and redistributing the rows according to the hash values. For example, the AMP $210_1$ begins hashing the rows $220_1$ on the join columns Table1.a and Table2.b and redistributing the rows $220_1$ among the AMPs $210_1$-$210_9$ according to the hash values. In a similar manner, each of the AMPs $210_2$-$210_9$ begins hashing join columns Table1.a and Table2.b of respective rows $220_2$-$220_9$ and redistributing the rows accordingly.

A dynamic skew detection routine may transition to a variation of a Partial Redistribution, Partial Duplication (PRPD) plan after data skew is dynamically detected in accordance with embodiments. To this end, while each AMP is hash redistributing the rows, an instance of a skew detection subroutine running on each of the AMPs $210_1$-$210_9$ monitors the number of rows that have been received by the respective AMP by redistribution from other AMPs. If an AMP is identified as a hot AMP by receiving more Table1 rows than expected, the hot AMP may then provide a notification to all other AMPs to terminate redistribution of any new rows to the hot AMP. For example, assume the skew detection routine running on AMP $210_3$ detects an excessive number of Table1 redistributed rows have been received by the AMP $210_3$ for storage in the AMP's spool $\text{Spool}^1_{redis}$ $403a$. The AMP $210_3$ then provides a notification to AMPs $210_1$-$210_2$ and $210_4$-$210_9$ of the detected hot status of the AMP $210_3$. The hot notification provided to AMPs $210_1$-$210_2$ and $210_4$-$210_9$ provides a directive to the AMPs $210_1$-$210_2$ and $210_4$-$210_9$ to stop redistributing rows to the hot AMP $210_3$. In this instance, when another AMP $210_1$-$210_2$ and $210_4$-$210_9$ encounters a row that would be redistributed to the hot AMP based on the hash of a join column Table1.a or Table2.b, the AMP does not distribute the row to the hot AMP. Instead, the AMP maintains rows of the skewed table Table1 in a local spool and broadcasts, or duplicates, rows of the table Table2 that would be redistributed to the hot AMP based on the hash value to all other AMPs. Finally, the rows of the larger, skewed table maintained locally by the AMPs that have been notified to terminate redistribution of rows to the hot AMP can be joined with those matching rows of the duplicated smaller table, Table2.

To facilitate dynamic skew detection, each of the AMPs $210_1$-$210_9$ has a respective spool ($\text{Spool}^1_{redis}$ $401a$-$409a$) allocated thereto in which the AMP $210_1$-$210_9$ stores rows of a first table (Table1) received by the AMP via redistribution from other AMPs. For example, the AMP $210_1$ has a spool $\text{Spool}^1_{redis}$ $401a$ in which the AMP $210_1$ stores rows of Table1 received from any of the AMPs $210_1$-$210_9$ as a result of the hash redistribution of the Table1 rows. In a similar manner, each of the AMPs $210_1$-$210_9$ has a respective spool ($\text{Spool}^2_{redis}$ $401b$-$409b$) allocated thereto in which the AMP $210_1$-$210_9$ stores rows of a second table (Table2) received by the AMP via redistribution from other AMPs.

In the event that an AMP detects receipt of an excessive number of redistributed Table1 rows for storage in the AMP's spool $\text{Spool}^1_{redis}$ thereby indicating data skew, the hot AMP provides a notification to the other AMPs to stop redistributing rows to the hot AMP as described above. In this instance, the detection of the hot AMP status and transmission of the hot AMP notification to the other AMPs triggers respective allocation of two additional spools $401c$-$409c$ and $401d$-$409d$ for each of the system AMPs $210_1$-$210_9$. Particularly, in the case of detection of a hot AMP due to skew in $\text{Spool}^1_{redis}$, a spool $\text{Spool}^1_{local}$ $401c$-$409c$ and a spool $\text{Spool}^2_{dup}$ $401d$-$409d$ is respectively allocated for each of the AMPs $210_1$-$210_9$. The spools $\text{Spool}^1_{local}$ $401c$-$409c$ are allocated to store rows of Table1 that would be redistributed by an AMP to the hot AMP if excessive receipt of redistributed rows by the hot AMP were not detected. For example, in the continuing example discussed above, the AMP $210_3$ detects excessive receipt of redistributed rows of Table1 to the spool $\text{Spool}^1_{redis}$ $403a$ and notifies AMPs $210_1$-$210_2$ and $210_4$-$210_9$ to stop redistributing rows of Table1 to AMP $210_3$. In this instance, when any AMP $210_1$-$210_2$ and $210_4$-$210_9$ hashes a join column Table1.a for redistribution of the corresponding row and determines the row would be redistributed to the hot AMP $210_3$, the AMP does not redistribute the row to the hot AMP $210_3$ but instead stores the row in the corresponding spool $\text{Spool}^1_{local}$ $401c$-$402c$ and $404c$-$409c$. For example, assume the notification to stop redistributing rows to the AMP $210_3$ has been received by each of the AMPs $210_1$-$210_2$ and $210_4$-$210_9$. Further assume that after receipt of the hot AMP notification, the AMP $210_6$ hashes a join column of a row of Table1 and determines the row would be redistributed to the AMP $210_3$. In this instance, the AMP $210_6$ does not redistribute the Table1 row to the hot AMP $210_3$, but instead stores the row in the Spool$^1_{local}$ 406c.

When any AMP $210_1$-$210_2$ and $210_4$-$210_9$ hashes a join column Table1.a for redistribution of the corresponding row of Table1 and determines the row is to be redistributed to any AMP other than the hot AMP $210_3$, the row is redistributed to the appropriate AMP according to the hash of the join column Table1.a, and the AMP that receives the redistributed row appends the row to the Spool$^1_{redis}$ allocated for the receiving AMP. For example, assume AMP $210_1$ hashes a join column of a row of Table1 and determines the row is to be redistributed to an AMP other than the hot AMP $210_3$. In this instance, the AMP $210_1$ redistributes the row according to the hash of the join column Table1.a. and the receiving AMP appends the redistributed row to Spool$^1_{redis}$ allocated to the receiving AMP.

When any AMP $210_1$-$210_2$ and $210_4$-$210_9$ hashes a join column Table2.b of a row of Table2 and determines the row would be redistributed to the hot AMP $210_3$, the AMP duplicates the row to each of the spools Spool$^2_{dup}$ 401d-409d. For example, assume AMP $210_1$ hashes a join column Table2.b of a row and determines the row would be redistributed to the hot AMP $210_3$ based on the hash value. In this instance, the AMP duplicates the row by transmitting the row to each of AMPs $210_2$-$210_9$. On receipt of the row, each of the AMPs $210_2$-$210_9$ appends the row to the respective spool Spool$^2_{dup}$ 402d-409d.

When any AMP $210_1$-$210_2$ and $210_4$-$210_9$ hashes a join column Table2.b of a Table2 row and determines the row is to be redistributed to any AMP other than the hot AMP $210_3$, the row is redistributed to the appropriate AMP according to the hash of the join column Table2.b, and the AMP that receives the redistributed row appends the row to the Spool$^2_{redis}$ allocated for the receiving AMP. For example, assume the AMP $210_1$ hashes a join column of a row of Table2 and determines the row is to be redistributed to an AMP other than the hot AMP $210_3$. In this instance, the AMP $210_1$ redistributes the row according to the hash of the join column Table2.b, and the receiving AMP appends the redistributed row to the Spool$^2_{redis}$ allocated to the receiving AMP.

Accordingly, each AMP including the hot AMP continues to redistribute rows of both tables Table1 and Table2. Any row of Table1 that would be redistributed to the hot AMP once the hot AMP has provided notification to the other AMPs to stop redistribution of rows thereto is maintained locally on each AMP in the spool Spool$^1_{local}$ allocated for the AMP, and any row of Table2 that would be redistributed to the hot AMP based on the hash of the join column is duplicated on each AMP including the hot AMP in each of the AMP's spool Spool$^2_{dup}$.

Figure 5:
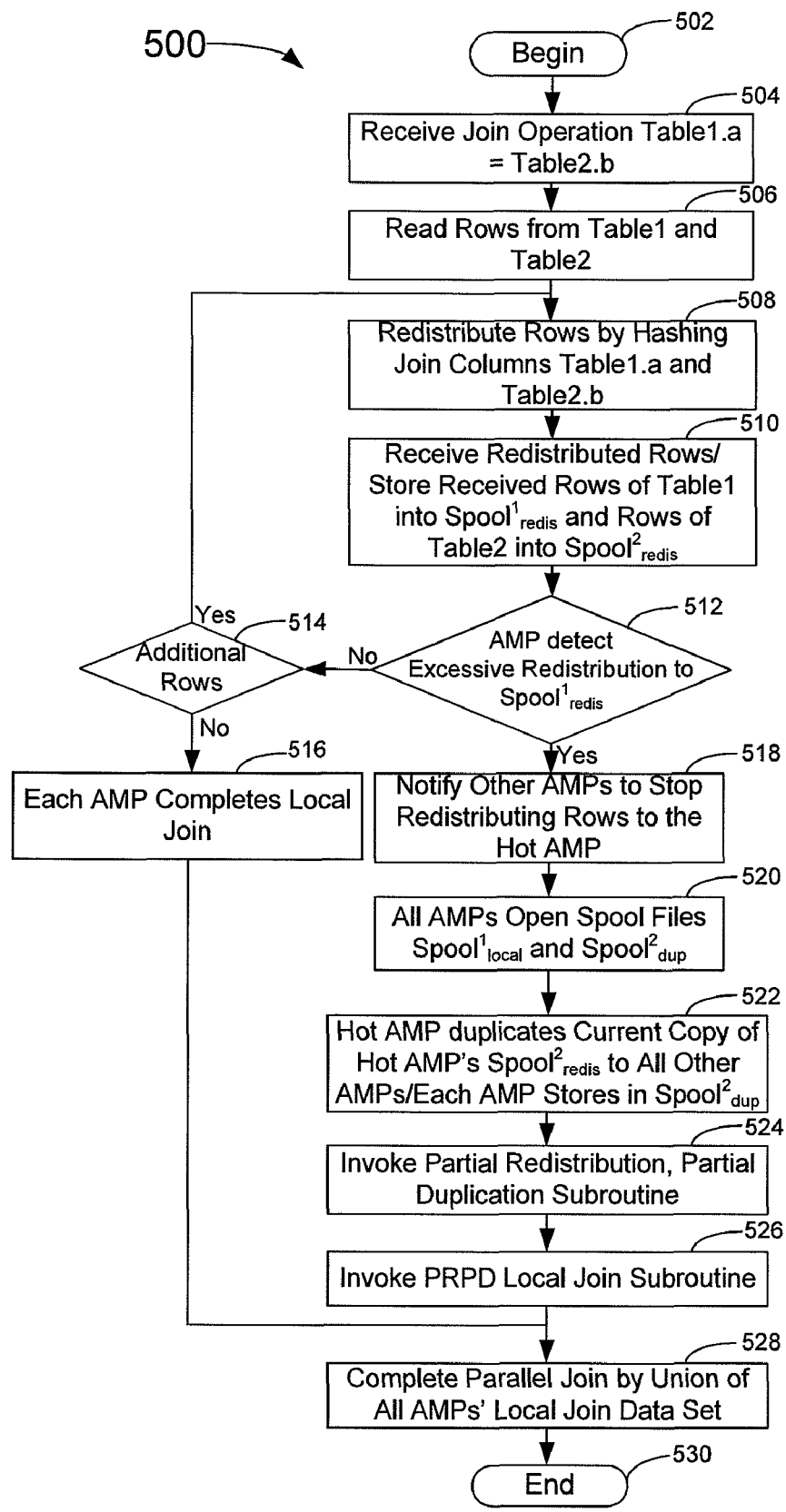
FIG. 5 is a flowchart that depicts processing of a parallel join subroutine that features dynamic skew detection and management implemented in accordance with an embodiment.

FIG. 5 is a flowchart 500 that depicts processing of a parallel join subroutine that features dynamic skew detection and management implemented in accordance with an embodiment. The processing steps of FIG. 5 may be implemented as computer-executable instructions tangibly embodied on a computer-readable medium executable by a processing system, such as one or more of the AMPs $210_1$-$210_9$ depicted in FIG. 4 of the MPP system 100 depicted in FIG. 1.

The parallel join subroutine is invoked (step 502), and a join operation is received (step 504). In the illustrative example, the join operation is on a first join column Table1.a of Table1 and a second join column Table2.b of Table2. Consistent with the examples provided above, it is assumed that both tables Table1 and Table2 have been distributed among a plurality of AMPs $210_1$-$210_9$ by a hash distribution of table indexes and that neither of the join columns Table1.a or Table2.b are included in the corresponding table indexes.

Each AMP $210_1$-$210_9$ that has any rows of the tables involved in the join operation allocated thereto then begin reading the AMPs' corresponding rows $220_1$-$220_9$ (step 506). The AMPs $210_1$-$210_9$ then begin hashing the join columns Table1.a and Table2.b and redistributing the rows accordingly (step 508). When an AMP receives a row redistributed from another AMP, the AMP stores the row redistributed thereto into the AMP's spool Spool$^1_{redis}$ if the row is a Table1 row and stores the row in the AMP's spool Spool$^2_{redis}$ if the row is a Table2 row (step 510).

Each AMP $210_1$-$210_9$ has an instance of a skew detection subroutine that monitors the number of rows redistributed to the respective AMP. On receipt of each row, the skew detection subroutine may evaluate whether the AMP has received an excessive number of Table1 redistributed rows for storage in the spool Spool$^1_{redis}$ thereby indicating data skew (step 512). For example, the skew detection subroutine may accumulate a count of the number of redistributed rows received by the AMP, and the number of rows may be compared with a threshold that, if exceeded, indicates the number of received rows is excessive. In an embodiment, the threshold may be specified according to the following:

Threshold=d*s, where s=|R|/(the number of AMPs);

|R|=Number of rows in Table1; and d is a system configurable constant greater than 1.

The value of d determines how skewed the data may be to tolerate processing according to traditional hash redistribution mechanisms. For example, if d is set to "2", then some AMPs may receive twice as many redistributed rows of Table1 as other AMPs prior to invoking the partial redistribution, partial duplication mechanisms of the disclosed embodiments.

In this particular implementation, only the number of redistributed rows of Table1 received by an AMP is considered to determine if the AMP is hot since the assumption is that Table1 is much larger than Table2. In practice, when both tables are large and are approximately the same size, the number of rows an AMP has received from Table2 may be considered when determining whether an AMP has become a hot AMP.

If the number of rows is not identified as excessive, an evaluation may be made to determine if additional rows remain to be redistributed by the AMP or if additional rows are being redistributed to the AMP (step 514). If additional rows remain for processing and none of the AMPs have been evaluated as hot, the AMPs may continue redistributing rows and receiving additional redistributed rows according to steps 508 and 510. If all rows have been redistributed with no AMPs being evaluated as hot during the redistribution routine, each AMP may perform a local join routine to generate a respective local join data set, i.e., a join of the Table1 and Table2 rows redistributed to the AMP (step 516). The local join data sets of each AMP may then be merged or unioned to complete the parallel join (step 528). The parallel join subroutine may then end (step 530).

Returning again to step 512, in the event that the number of Table1 redistributed rows received by an AMP is identified as excessive thereby indicating the AMP is hot, the hot AMP may provide a notification to the other AMPs to stop redistributing rows to the hot AMP (step 518). Continuing with the example discussed hereinabove, assume AMP $210_3$ detects an excessive number of Table1 rows have been redistributed to the AMP $210_3$. In this instance, AMP $210_3$ provides a notification to each of the AMPs $210_1$-$210_2$ and $210_4$-$210_9$ to stop redistributing rows to the hot AMP $210_3$ according to step 518. Upon transmission of the hot AMP notification and receipt of the notification by the MPP system AMPs, each AMP opens respective spools Spool local $401c$-$409c$ and $Spool^2_{dup}$ $401d$-$409d$ (step 520). The hot AMP $210_3$ duplicates the copy of the hot AMP's $Spool^2_{redis}$ to all the other AMPs $210_1$-$210_2$ and $210_4$-$210_9$ which store the duplicated rows in the AMPs' respective spool $Spool^2_{dup}$ $401d$-$409d$ (step 522). On the hot AMP, the duplication step of step 522 may be carried out by simply renaming the $Spool^2_{redis}$ to $Spool^2_{dup}$. A partial redistribution, partial duplication (PRPD) subroutine instance is then invoked on each of the AMPs (step 524) as described more fully hereinbelow with reference to FIGS. 6 and 7. Each AMP, upon completion of the PRPD subroutine, may then invoke a PRPD local join subroutine (step 526) as described more fully hereinbelow with reference to FIGS. 8 and 9. After each AMP's instance of the PRPD local join subroutine has completed processing, the parallel join is completed by merging or unioning each AMP's respective local join data set (step 528), and the parallel join subroutine cycle may then end according to step 530.

Figure 6:
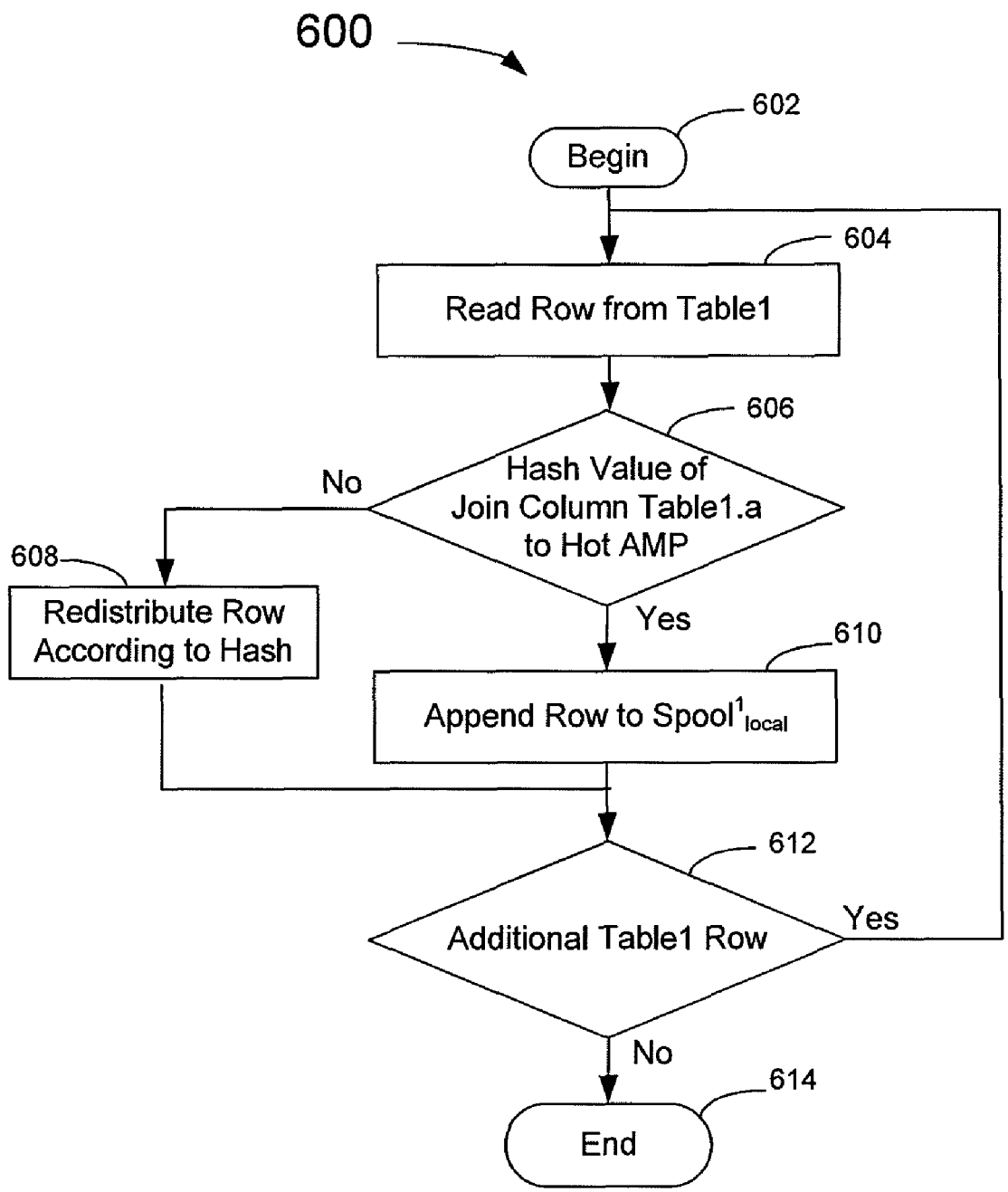
FIG. 6 is a flowchart that depicts processing of a partial redistribution, partial duplication subroutine that facilitates redistribution or local storage of rows of a dynamically detected skewed table implemented in accordance with an embodiment.

FIG. 6 is a flowchart 600 that depicts processing of a partial redistribution, partial duplication subroutine that facilitates redistribution or local storage of rows of a dynamically detected skewed table Table1 implemented in accordance with an embodiment. The processing steps of FIG. 6 may be implemented as computer-executable instructions tangibly embodied on a computer-readable medium executable by a processing system, such as one or more of the AMPs $210_1$-$210_9$ depicted in FIG. 4 of the MPP system 100 depicted in FIG. 1. The partial redistribution, partial duplication subroutine depicted and described with reference to FIG. 6 generally corresponds with step 524 of FIG. 5 for redistribution or local storage of rows of Table1.

The PRPD subroutine is invoked (step 602), and each AMP $210_1$-$210_9$ continues reading rows $220_1$-$220_9$ from the table Table1 for redistribution or local storage of the Table1 rows (step 604). The AMP hashes the join column Table1.$a$ of a row and determines if the row would be redistributed to the hot AMP based on the hash value (step 606). If the row is not to be redistributed to the hot AMP based on the hash value of the join column Table1.$a$, the AMP redistributes the row to an AMP based on the hash value (step 608), and the AMP that receives the redistributed row appends the row to the AMP's spool $Spool^1_{redis}$. The AMP's PRPD subroutine may then proceed to evaluate whether an additional Table1 row remains for redistribution or local storage (step 612).

Returning again to step 606, if the hash value of the join column Table1.$a$ results in a value such that the row would be redistributed to a hot AMP, the AMP does not redistribute the row to the hot AMP but instead appends the row to the AMP's spool $Spool^1_{local}$ (step 610) thereby locally storing the row. The AMP's PRPD subroutine may then proceed to evaluate whether an additional row of Table1 remains for redistribution or local storage according to step (612). When no additional rows of Table1 remain for redistribution or local storage, the partial redistribution, partial duplication subroutine cycle may then end (step 614).

Figure 7:
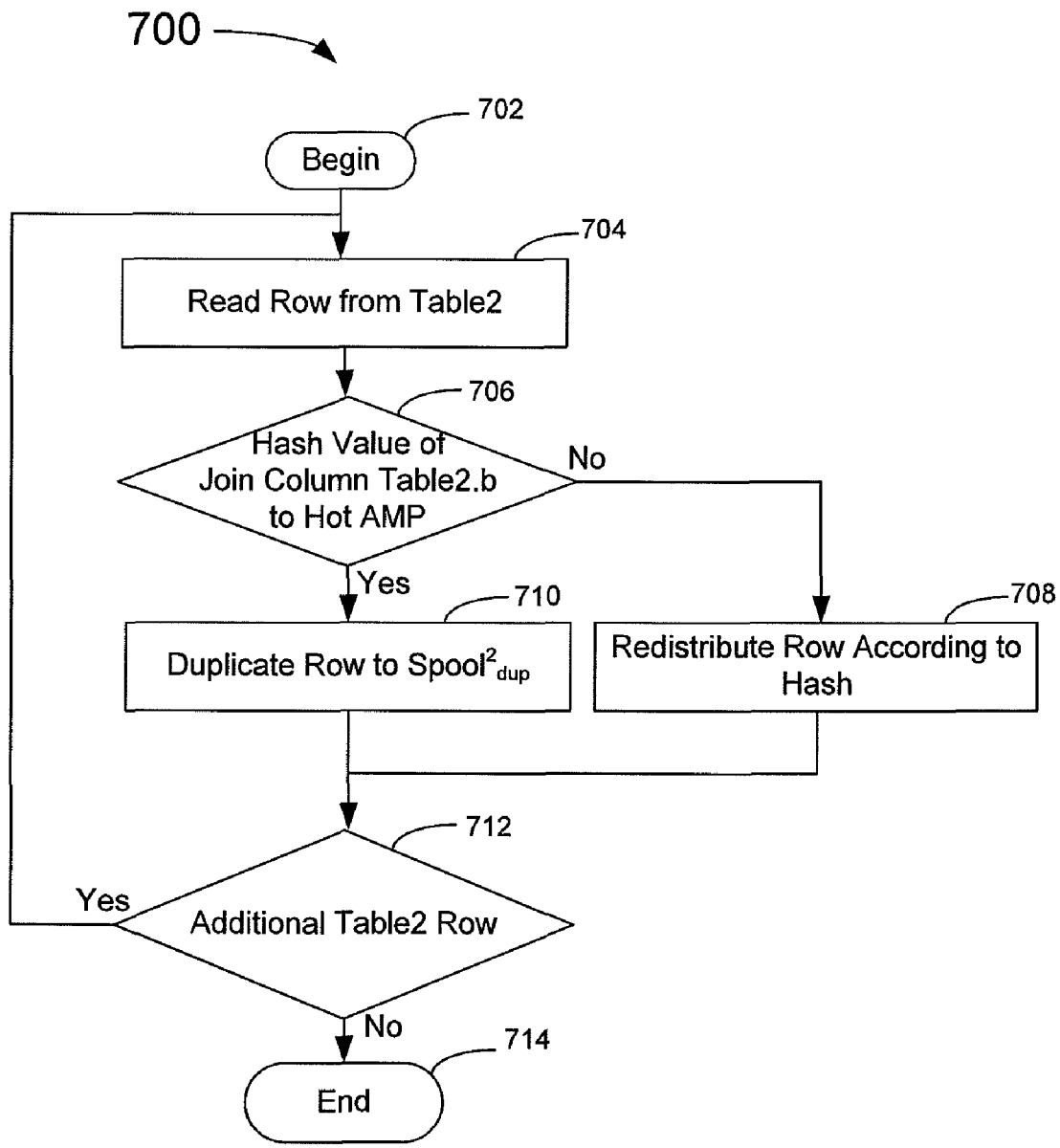
FIG. 7 is a flowchart that depicts processing of a partial redistribution, partial duplication subroutine that facilitates redistribution or duplication of table rows in accordance with an embodiment.

FIG. 7 is a flowchart 700 that depicts processing of a partial redistribution, partial duplication subroutine that facilitates redistribution or duplication of table rows in accordance with an embodiment. The processing steps of FIG. 7 may be implemented as computer-executable instructions tangibly embodied on a computer-readable medium executable by a processing system, such as one or more of the AMPs $210_1$-$210_9$ depicted in FIG. 4 of the MPP system 100 depicted in FIG. 1. The partial redistribution, partial duplication subroutine depicted and described with reference to FIG. 7 generally corresponds to step 524 of FIG. 5 for redistribution or duplication of rows of a smaller table Table2 involved in a join operation for which data skew has dynamically been detected by an AMP.

The PRPD subroutine is invoked (step 702), and a Table2 row is read (step 704). A hash value of the join column Table2.$b$ is then calculated, and an evaluation is made to determine if the row would be redistributed to a hot AMP based on the hash value of the column Table2.$b$ (step 706). If the row would not be redistributed to a hot AMP based on the hash value of the join column Table2.$b$, the AMP redistributes the row to an AMP based on the hash value (step 708), and the AMP that receives the redistributed row appends the row to the AMP's spool $Spool^2 redis$. The AMP's PRPD subroutine may then proceed to evaluate whether an additional Table2 row remains for redistribution or duplication according to step 712.

Returning again to step 706, if the row would be redistributed to a hot AMP based on the hash value of the join column Table2.$b$, the AMP does not redistribute the row to the hot AMP but instead duplicates the row to each AMP's spool $Spool^2_{dup}$ (step 710). Duplication of the row may be performed, for example, by appending the row to a duplicate buffer, or other suitable memory space, allocated to the AMP. Upon completion of the table scan by the AMP, the rows that have been identified as having a skewed value of the column Table2.$b$ are duplicated to a respective spool $Spool^2_{dup}$ of each AMP where Table1 resides. For example, duplication of the rows of Table2 having a skewed column Table2.$b$ value may be performed by the interconnect 130, associated hardware and/or software. It should be understood that each AMP, including the AMP that sources rows to be duplicated, has the duplicated rows stored in the AMP's respective spool $Spool^2_{dup}$. The AMP's PRPD subroutine may then proceed to evaluate whether an additional Table2 row remains for redistribution or duplication according to step 712. When no additional Table2 rows remain for redistribution or duplication, the partial redistribution, partial duplication subroutine cycle may then end (step 714).

Notably, after detection of a hot AMP, each AMP including the hot AMP continues to redistribute rows of both tables involved in the join operation. Any row of Table1 that would be redistributed to the hot AMP if the hot AMP had not been identified as hot is kept locally on each AMP including the hot AMP in the AMP's spool $Spool^1_{local}$, and any row of Table2 that would be redistributed to the hot AMP if the hot AMP had not been identified as hot is duplicated on each AMP's spool $Spool^2_{dup}$ including the hot AMP.

Figure 8:
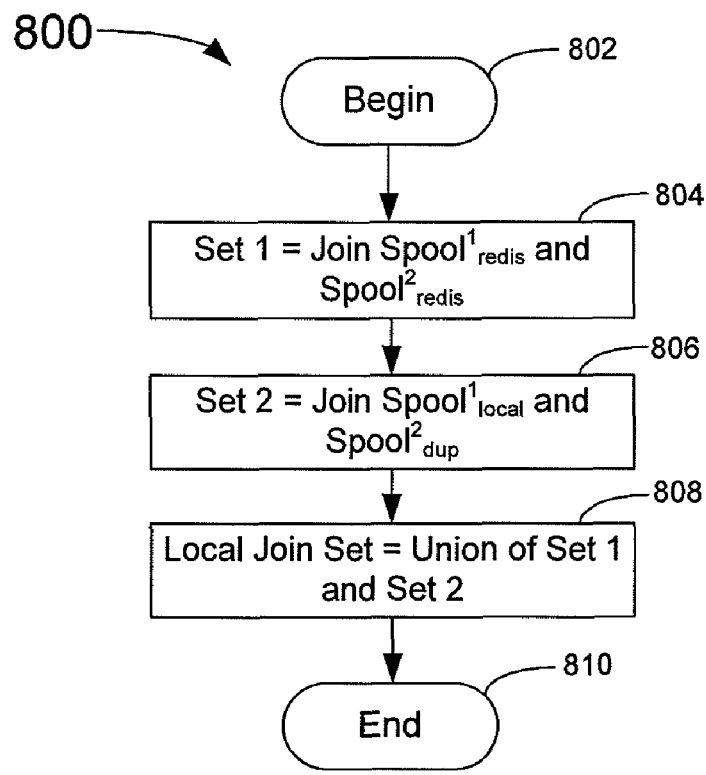
FIG. 8 is a flowchart that depicts processing of an instance of a partial redistribution, partial duplication local join subroutine that performs a local join for non-hot Access Module Processors when any Access Module Processor has been identified as hot in accordance with an embodiment.

FIG. 8 is a flowchart 800 that depicts processing of an instance of a PRPD local join subroutine that performs a local join for non-hot AMPs when any AMP has been identified as a hot AMP in accordance with an embodiment. The processing steps of FIG. 8 may be implemented as computer-executable instructions tangibly embodied on a computer-readable medium executable by a processing system, such as one or more of the AMPs $210_1$-$210_9$ depicted in FIG. 4 of the MPP system 100 depicted in FIG. 1. The local join subroutine described with reference to FIG. 8 is run by each non-hot AMP. For example, continuing with the example provided hereinabove in which AMP $210_3$ has been identified as hot, and none of the other AMPs $210_1$-$210_2$ and $210_4$-$210_9$ have been identified as hot, an instance of the local join subroutine of FIG. 8 would be run by each of the non-hot AMPs $210_1$-$210_2$ and $210_4$-$210_9$. The processing steps of FIG. 8 generally correspond to step 526 of FIG. 5 for non-hot AMPs.

The PRPD local join subroutine is invoked (step 802), and each of the non-hot AMPs $210_1$-$210_2$ and $210_4$-$210_9$ generates a first data set (Set 1) by joining the AMP's respective $Spool^1_{redis}$ 401*a*-402*a* and 404*a*-409*a* and $Spool^2_{redis}$ 401*b*-402*b* and 404*b*-409*b* (step 804). Each non-hot AMP 210$_1$-210$_2$ and 210$_4$-210$_9$ generates a second data set (Set 2) by joining the AMP's respective spool $Spool^1_{local}$ 401*c*-402*c* and 404*c*-409*c* and spool $Spool^2_{dup}$ 401*d*-402*d* and 404*d*-409*d* (step 806). Each non-hot AMP 210$_1$-210$_2$ and 210$_4$-210$_9$ then generates a respective local join data set by unioning the Set 1 and Set 2 resulting from steps 804 and 806 (step 808), and the PRPD local join subroutine then ends (step 810).

The first join data set, Set 1, semantically comprises a join of the rows of Table1 and Table2 that are redistributed to the non-hot AMP from all AMPs as in a traditional hash redistribution. Semantically, the second join data set, Set 2, comprises a join of the rows of Table1 and Table2 on the non-hot AMP that would have been redistributed to the hot AMP as in a traditional hash redistribution. Essentially, the second join data set offloads some burden from the hot AMP relative to a traditional hash redistribution mechanism.

Figure 9:
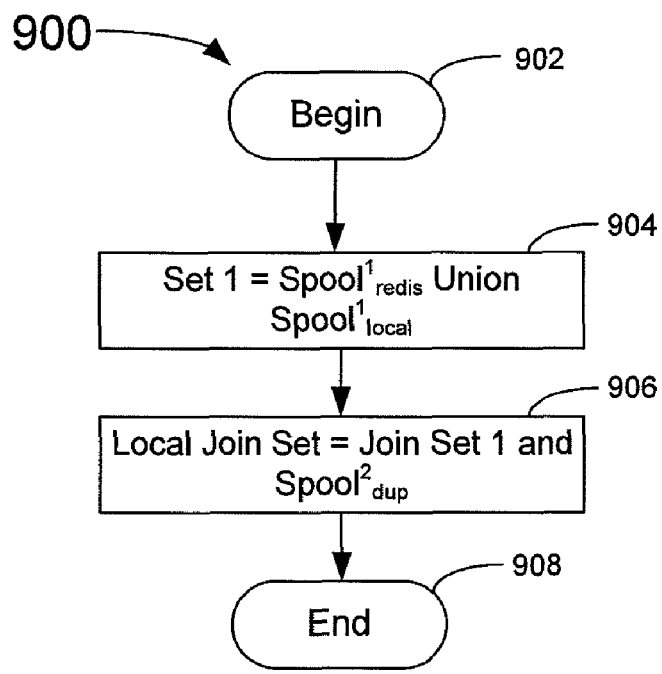
FIG. 9 is a flowchart that depicts processing of an instance of a partial redistribution, partial duplication local join subroutine that performs a local join for an Access Module Processor identified as hot in accordance with an embodiment.

FIG. 9 is a flowchart 900 that depicts processing of an instance of a PRPD local join subroutine that performs a local join for an AMP identified as hot in accordance with an embodiment. The processing steps of FIG. 9 may be implemented as computer-executable instructions tangibly embodied on a computer-readable medium executable by a processing system, such as one or more of the AMPs 210$_1$-210$_9$ depicted in FIG. 4 of the MPP system 100 depicted in FIG. 1. The PRPD local join subroutine described with reference to FIG. 9 is run by each hot AMP, e.g., AMP 210$_3$ in the examples provided herein. The processing steps of FIG. 9 generally correspond to step 526 of FIG. 5 for any AMPs that have been identified as hot.

The PRPD local join subroutine is invoked (step 902), and each hot AMP 210$_3$ generates a first data set (Set 1) by performing a union of the AMP's $Spool^1_{redis}$ 403*a* and $Spool^1_{local}$ 403*c* (step 904). Each hot AMP 210$_3$ generates a local join data set by joining the Set 1 produced from step 904 and the AMP's spool $Spool^2_{dup}$ 403*d* (step 906), and the local join subroutine then ends (step 908). The parallel join is then completed by merging or unioning each local join data set from each hot AMP and each non-hot AMP according to step 528 of FIG. 5.

The semantics of the local join performed on the hot AMP provide that any row redistributed/broadcast to the hot AMP or kept locally on the hot AMP should be sent to the hot AMP in the traditional hash redistribution. Therefore, the local join performed on the hot AMP logically joins every row of Table1 in the hot AMP's spools to every row of Table2 in the hot AMP's spools. Notably, there is no need to eliminate duplicates in the two above unions because there are no duplicates in the union operands.

Advantageously, each AMP only scans the rows of the tables allocated thereto once. If there is no data skew detected in the process of redistributing rows of the tables involved in the join, then the parallel join is carried out according to a traditional hash redistribution mechanism, and no extra significant processing cost is incurred.

The described mechanisms work in the same manner whether there is only one hot AMP or there are multiple hot AMPs. When there are multiple hot AMPs, one spool $Spool^1_{local}$ may be respectively maintained for each hot AMP, or a separate spool $Spool^1_{local}$ may be maintained for each hot AMP. The former approach may be easier to implement, while the latter approach may exhibit performance advantages since each separate spool has only rows that hash to the same AMP in the traditional plan which can be used to join rows broadcast from the $Spool^2_{dup}$ faster since fewer rows of Table1 have to be checked.

In the presence of data skew, part of the larger, skewed table is redistributed and part of the larger, skewed table is maintained locally by the AMPs. Part of the smaller table is redistributed and part of the smaller table is duplicated by the AMPs. Advantageously, the described PRPD mechanisms detect skew at the AMP level rather than the skewed data value level.

As described, a method, computer-readable medium, and system that facilitates dynamic detection and management of data skew during a parallel join operation are provided. Portions of tables involved in the join operation are distributed among a plurality of processing modules, and each of the processing modules is allocated respective spools $Spool^1_{redis}$ and $Spool^2_{redis}$. Each processing module begins redistributing rows of the tables by hash redistributing the rows on the join columns of the tables. An instance of a data skew detection subroutine is invoked for each of the processing modules involved in the join operation. In the event that a data skew detection subroutine detects receipt of an excessive number of rows at a processing module as a result of the redistribution, the processing module is identified as a hot processing module and the other processing modules are notified to stop redistributing rows to the hot processing module. Each of the processing modules is then allocated respective spools $Spool^1_{local}$ and $Spool^2_{dup}$. The hot processing module duplicates rows of the hot processing module's spool $Spool^2_{redis}$ to all of the processing modules. Each processing module continues redistributing rows to other processing modules except the hot processing module and appends redistributed rows of the larger, skewed table into the spool $Spool^1_{redis}$ and rows of the second table into the spool $Spool^2_{redis}$. When a processing module encounters a row that would be redistributed to the hot processing module, the processing module appends the row to either the processing module's spool $Spool^1_{local}$ or duplicates the row to each of the processing modules spool $Spool^2_{dup}$. When all rows of the tables have been redistributed, maintained locally, or duplicated, each of the processing modules generates a local join data set, and the parallel join operation is completed by merging all of the local join data sets.

The flowcharts of FIGS. 5-9 depict process serialization to facilitate an understanding of disclosed embodiments and are not necessarily indicative of the serialization of the operations being performed. In various embodiments, the processing steps described in FIGS. 5-9 may be performed in varying order, and one or more depicted steps may be performed in parallel with other steps. Additionally, execution of some processing steps of FIGS. 5-9 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of performing a parallel join operation in a parallel processing system, comprising:

distributing a respective set of rows of a first table and a second table involved in a join operation to each of a plurality of processing modules, wherein the join operation comprises a join on a first column of the first table and a second column of the second table;

allocating a respective first spool and a respective second spool to each of the plurality of processing modules;

hashing the respective set of rows of the first table on the first column and the respective set of rows of the second table on the second column by each of the plurality of processing modules;

redistributing, by each of the plurality of processing modules, at least a portion of the rows of the respective set of rows distributed thereto based on a hash value of a join column of each row to one of the plurality of processing modules;

detecting, by a first processing module of the plurality of processing modules, receipt of an excessive number of rows as a result of redistribution of the rows;

allocating a respective third spool and a respective fourth spool to each of the plurality of processing modules in response to detection of the receipt of the excessive number of rows by the first processing module;

transmitting, by the first processing module, any rows stored in the second spool allocated to the first processing module to each other processing module of the plurality of processing modules;

storing, by each of the other processing modules, any rows received from the first processing module stored in the second spool allocated to the first processing module in the respective fourth spool allocated to the other processing modules;

storing, by the first processing module, any rows of the second spool allocated to the first processing module in the fourth spool allocated to the first processing module;

storing, by each of the plurality of processing modules, each row of the first table redistributed by the plurality of processing modules in the first spool respectively allocated to the plurality of processing modules;

storing, by each of the plurality of processing modules, each row of the second table redistributed by the plurality of processing modules in the second spool respectively allocated to the plurality of processing modules;

continuing redistribution of the rows by each of the plurality of processing modules after detection of receipt of an excessive number of rows by the first processing module, wherein any row of the first table that would be redistributed, by a processing module of the plurality of processing modules, to the first processing module is maintained locally by the processing module in the third spool allocated to the processing module, and wherein any row of the second table that would be redistributed, by the processing module of the plurality of processing modules, to the first processing module is duplicated to each of the plurality of processing modules for storage in the respective fourth spool;

generating, by each of the other processing modules, a first data set by joining rows of the first spool respectively allocated to each of the other processing modules with rows of the second spool respectively allocated to each of the other processing modules;

generating, by each of the other processing modules, a second data set by joining rows of the third spool respectively allocated to each of the other processing modules with rows of the fourth spool respectively allocated to each of the other processing modules;

generating, by each of the other processing modules, a respective local join data set by unioning the respective first data set with the respective second data set;

generating, by the first processing module, a third data set by performing a union of rows of the first spool allocated to the first processing module with rows of the third spool allocated to the first processing module;

generating, by the first processing module, a local join data set of the first processing module by joining the third data set with rows of the fourth spool allocated to the first processing module; and completing the join operation by merging each local join data set of the respective other processing modules with the local join data set of the first processing module.

2. The method of claim 1, further comprising notifying, by the first processing module, each other processing module of the plurality of processing modules to terminate redistribution of rows to the first processing module in response to detection of receipt of an excessive number of rows.

3. A computer program residing on a computer-readable medium and having computer-executable instructions for execution by a processing system, the computer-executable instructions for performing a parallel join operation in a parallel processing system, the computer-executable instructions, when executed, cause the processing system to:

distribute a respective set of rows of a first table and a second table involved in a join operation to each of a plurality of processing modules, wherein the join operation comprises a join on a first column of the first table and a second column of the second table;

allocate a respective first spool and a respective second spool to each of the plurality of processing modules;

hash the respective set of rows of the first table on the first column and the respective set of rows of the second table on the second column by each of the plurality of processing modules;

redistribute, by each of the plurality of processing modules, at least a portion of rows of the respective set of rows distributed thereto based on a hash value of a join column of each mw to one of the plurality of processing modules;

detect, by a first processing module of the plurality of processing modules, receipt of an excessive number of rows as a result of redistribution of the rows;

allocate a respective third spool and a respective fourth spool to each of the plurality of processing modules in response to detection of the receipt of the excessive number of rows by the first processing module;

transmit, by the first processing module, any rows stored in the second spool allocated for the first processing module to each other processing module of the plurality of processing modules;

store, by each of the other processing modules, any rows received from the first processing module stored in the second spool of the first processing module in the respective fourth spool allocated to the other processing modules;

store, by the first processing module, any rows of the second spool allocated to the first processing module in the fourth spool allocated to the first processing module;

store, by each of the plurality of processing modules, each mw of the first table redistributed by the plurality of processing modules in the first spool respectively allocated to the plurality of processing modules;

store, by each of the plurality of processing modules, each mw of the second table redistributed by the plurality of processing modules in the second spool respectively allocated to the plurality of processing modules;

continue redistribution of the rows by each of the plurality of processing modules after detection of receipt of an excessive number of rows by the first processing module, wherein any row of the first table that would be redistributed, by a processing module of the plurality of processing modules, module is maintained locally by the processing module in the third spool allocated to the processing module, and wherein any row of the second table that would be redistributed, by the processing module of the plurality of processing modules, module is duplicated to each of the plurality of processing modules for storage in the respective fourth spool;

generate, by each of the other processing modules, a first data set by joining rows of the first spool respectively allocated to each of the other processing modules with rows of the second spool respectively allocated to each of the other processing modules;

generate, by each of the other processing modules, a second data set by joining rows of the third spool respectively allocated to each of the other processing modules with rows of the fourth spool respectively allocated to each of the other processing modules;

generate, by each of the other processing modules, a respective local join data set by unioning the respective first data set with the respective second data set;

generate, by the first processing module, a third data set by performing a union of rows of the first spool allocated to the first processing module with rows of the third spool allocated to the first processing module;

generate, by the first processing module, a local join data set of the first processing module by joining the third data set with rows of the fourth spool allocated to the first processing module; and complete the join operation by merging each local join data set of the respective other processing modules with the local join data set of the first processing module.

4. The computer program of claim 3, further comprising instructions that, when executed, cause the processing system to notify, by the first processing module, each other processing module of the plurality of processing modules to terminate redistribution of rows to the first processing module in response to detection of receipt of an excessive number of rows.

5. A database management system, comprising:

a plurality of processing modules;

at least one storage device to which respective sets of rows of a first table and a second table involved in a join operation are allocated to each of the plurality of processing modules, wherein the join operation comprises a join on a first column of the first table and a second column of the second table; and at least one memory device that stores a respective first spool and a respective second spool allocated to each of the plurality of processing modules, wherein each of the plurality of processing modules hashes the respective set of rows of the first table on the first column and the respective set of rows of the second table on the second column and redistributes rows of the respective set of rows based on a hash value of each row to one of the plurality of processing modules, and wherein a first processing module of the plurality of processing modules detects receipt of an excessive number of rows as a result of redistribution of the rows;

wherein the first processing module notifies each other processing module of the plurality of processing modules to terminate redistribution of rows to the first processing module, and wherein a respective third spool and a respective fourth spool are allocated to each of the plurality of processing modules;

wherein the first processing module transmits any rows stored in the second spool allocated to the first processing module to each other processing module, wherein each other processing module stores any rows received from the first processing module stored in the second spool allocated to the first processing module in the respective fourth spool allocated to the other processing module, and wherein the first processing module stores any rows of the second spool allocated to the first processing module in the fourth spool allocated to the first processing module.

6. The system of claim 5, wherein each of the plurality of processing modules stores each row of the first table redistributed by the plurality of processing modules in the first spool respectively allocated to the plurality of processing modules and stores each row of the second table redistributed by the plurality of processing modules in the second spool respectively allocated to the plurality of processing modules, wherein redistribution of the rows is continued by each of the plurality of processing modules after detection of receipt of an excessive number of rows by the first processing module, wherein any row of the first table that would be redistributed, by a processing module of the plurality of processing modules, to the first processing module is maintained locally by the processing module in the third spool allocated to the processing module, and wherein any row of the second table that would be redistributed by the processing module to the first processing module is duplicated to the plurality of processing modules.

* * * * *